US008078196B2

(12) United States Patent
Ruckart et al.

(10) Patent No.: US 8,078,196 B2
(45) Date of Patent: Dec. 13, 2011

(54) METHODS, SYSTEMS AND COMPUTER PROGRAM PRODUCTS FOR PROVIDING INFORMATION USING AN ADVERTISING MESSAGE WITH A DYNAMIC FIELD

(75) Inventors: John Ruckart, Atlanta, GA (US); Scott Frank, Dunwoody, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 620 days.

(21) Appl. No.: 11/700,619

(22) Filed: Jan. 31, 2007

(65) Prior Publication Data

US 2008/0182590 A1 Jul. 31, 2008

(51) Int. Cl.
*H04W 24/00* (2009.01)
(52) U.S. Cl. ............... 455/456.3; 455/456.1; 455/412.2
(58) Field of Classification Search ............... 455/456.1, 455/456.3, 412.2
See application file for complete search history.

(56) References Cited

U.S. PATENT DOCUMENTS

| 6,374,182 | B2 | 4/2002 | Bechtolsheim et al. |
| 7,395,149 | B2* | 7/2008 | Matsumoto et al. ......... 701/207 |
| 2002/0091568 | A1* | 7/2002 | Kraft et al. ...................... 705/14 |
| 2002/0184089 | A1 | 12/2002 | Tsou et al. |
| 2003/0026231 | A1* | 2/2003 | Lazaridis et al. ............. 370/338 |
| 2003/0212996 | A1* | 11/2003 | Wolzien .......................... 725/60 |
| 2004/0198396 | A1* | 10/2004 | Fransioli .................... 455/456.3 |
| 2006/0064346 | A1 | 3/2006 | Steenstra et al. |
| 2007/0150516 | A1* | 6/2007 | Morgan et al. ............ 707/104.1 |
| 2007/0239348 | A1 | 10/2007 | Cheung |
| 2008/0153513 | A1* | 6/2008 | Flake et al. ................. 455/456.3 |
| 2008/0167801 | A1 | 7/2008 | Geelen et al. |

* cited by examiner

*Primary Examiner* — Barry Taylor
(74) *Attorney, Agent, or Firm* — Parks IP Law LLC; Mickki D. Murray, Esq.

(57) ABSTRACT

Methods, systems and computer program products for updating information for an identified location on a mobile device are provided. A broadcast advertising message is provided to a mobile device. The advertising message identifies a location and includes a dynamic field configured to provide updated information about the identified location. When the advertising message is activated by the mobile device, a current position of the mobile device is determined. The dynamic field of the advertising message is automatically populated based on the current position of the mobile device to provide updated information about the identified location.

20 Claims, 6 Drawing Sheets

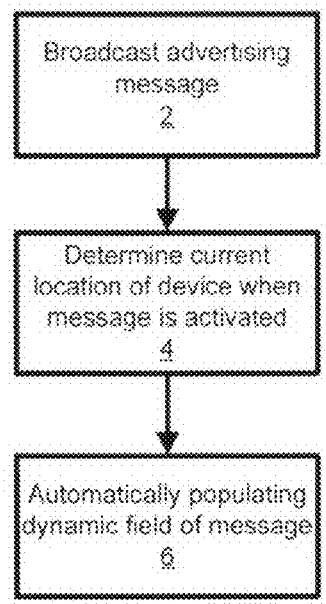
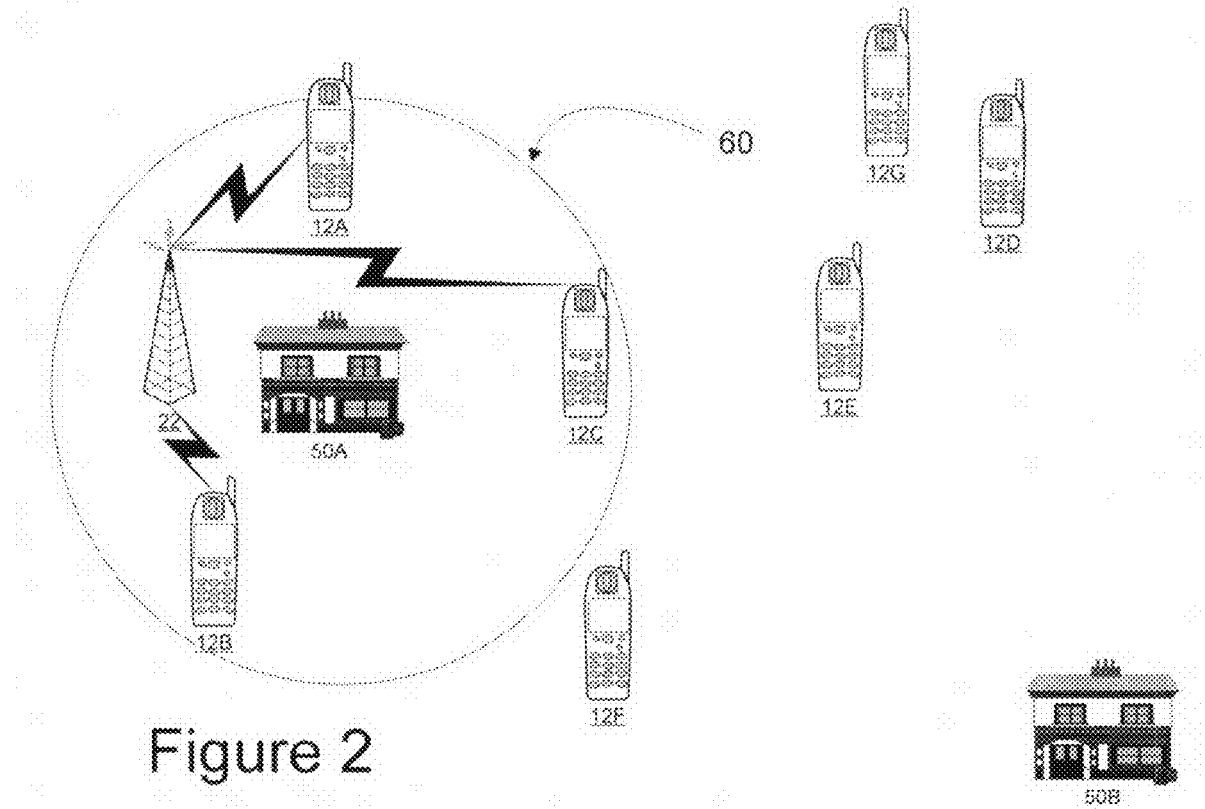

METHODS, SYSTEMS AND COMPUTER PROGRAM PRODUCTS FOR PROVIDING INFORMATION USING AN ADVERTISING MESSAGE WITH A DYNAMIC FIELD

FIELD OF THE INVENTION

The present invention relates to targeted advertising on a mobile device.

BACKGROUND OF THE INVENTION

Conventional advertising is experiencing a reduction in viewers, in part, because automatic digital recording devices enable viewers to view broadcast television without commercials. Various forms of targeted advertising have been used in an attempt to regain viewers and provide alternative modes of advertising.

For example, U.S. Patent Publication No. 2006/0064346 to Steenstra et al. discusses techniques for displaying advertising information based on a user profile and the geographic location of the device.

U.S. Patent Publication No. 2002/0184089 to Tsou et al. is directed to "real-time instant presence with advertising" (RIPA). Instant messaging topology and wireless technology are used to setup and update information of an instant messaging user. Advertising and network marketing of a business using presence information sent to instant messaging users are also provided.

U.S. Patent Publication No. 2004/0198396 to Fransioli is directed to methods for providing location-based messaging to a mobile user with a wireless portable receiving device, including content based on the location and the travel direction of the device.

U.S. Patent Application Publication No. 2002/0184089 to Tsou et al. proposes methods for promotion, advertising and network marketing of a business using presence information sent to instant messaging users and instantly propagated through instant messaging address lists.

SUMMARY OF THE INVENTION

According to certain embodiments of the present invention, a method of updating information for an identified location on a mobile device includes providing a broadcast advertising message to a mobile device. The advertising message identifies a location and includes a dynamic field configured to provide information about the identified location. The advertising message is activated by the mobile device. A current position of the mobile device is determined. The dynamic field of the advertising message is automatically populated based on the current position of the mobile device to provide updated information about the identified location.

In certain embodiments, the updated information includes directions from the current position of the mobile device to the identified location. In some embodiments, the broadcast messages broadcast to at least one mobile device in a selected geographic region.

In particular embodiments, the advertising message is configured to display and integrated graphical image including advertising information about an enterprise at the identified location and directions from the current position of the mobile device to the identified location. The enterprise can include a plurality of related enterprises and a corresponding plurality of identified locations. One of the plurality of related enterprises may be selected based on the current position of the mobile device. Automatically populating the dynamic fields may be based on the selected enterprise and the corresponding identified location.

In certain embodiments of the present invention, when the advertising message is activated, a velocity of the mobile device is determined. Directions may be provided that include first directions if the velocity is greater than a threshold amount and second directions if velocity is less than the threshold amount, wherein the first and second direction are different.

In some embodiments, a user may be notified when an advertising message is received, such as with an audible, tactile and/or visual notification.

BRIEF DESCRIPTION OF THE DRAWINGS

FIG. 1 is a flowchart illustrating operations according to some embodiments of the present invention.

FIG. 2 is a schematic diagram illustrating network having a base station broadcasting an advertising message to a plurality of mobile devices in a selected geographic region according to some embodiments of the present invention.

DETAILED DESCRIPTION OF THE INVENTION

Figure 3:
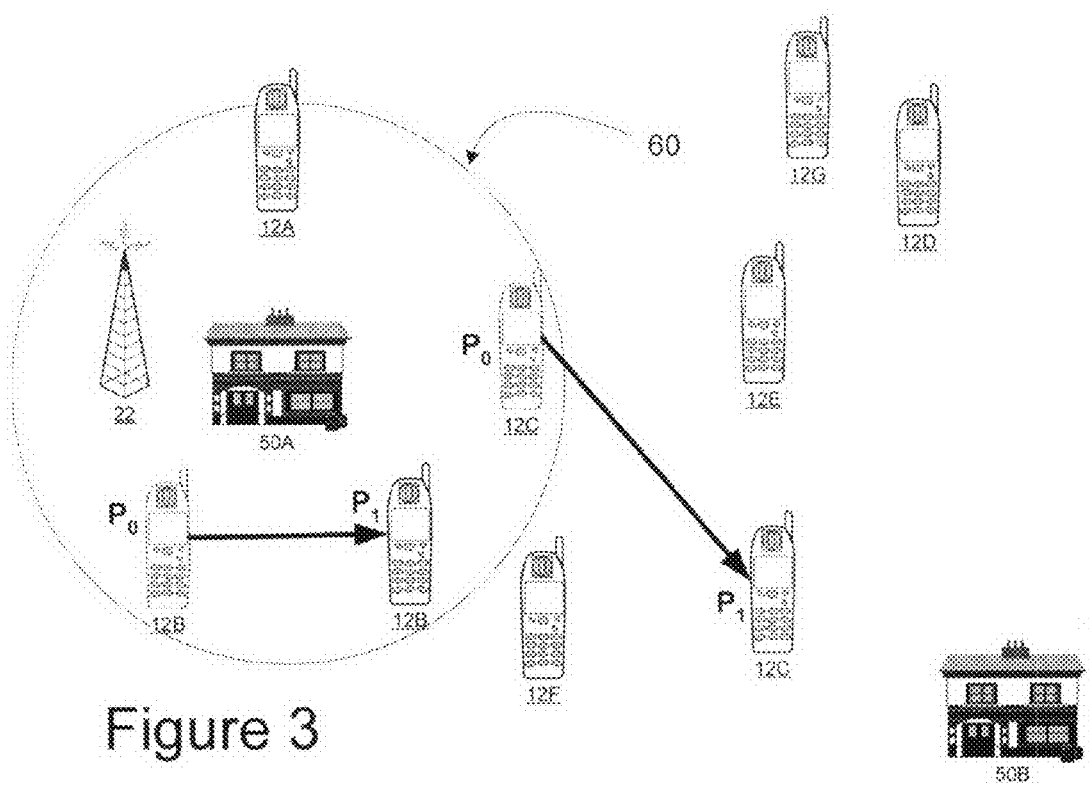
FIG. 3 is a schematic diagram illustrating movement of some of the plurality of mobile devices in the network of FIG. 2.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

Various embodiments of the present invention will now be described with reference to FIGS. 1-8.

As illustrated in FIG. 1, a broadcast advertising message can be provided to a mobile device at Block 2. The advertising message can identify location and included a dynamic field configured to provide directions to the identified location. When a mobile device activates the advertising message, the current position of the mobile device is determined at Block 4. The dynamic field of the advertising message is automatically populated at Block 6 based on the current position of the mobile device to provide updated information such as directions from the current position of the mobile device to be identified location. Accordingly, a user can receive a broadcast advertising message at one position and open the advertising message at a later time in a different position and be provided with directions from the current position of the mobile device.

As used herein, the term "broadcast message" refers to a message that is transmitted to one or more mobile devices in a selected geographic region. A broadcast message can be sent to all of the devices in a selected geographic region, or to selected devices in a geographic region, such as based on the user profile for each device. For example, the user or a system administrator can set up a user profile that includes options to receive or not to receive certain types of broadcast messages.

The advertising message may be in any suitable format, including SMS, HTML, e-mail instant messaging, etc. The advertising message can include a dynamic field that may be populated by the current location of mobile device and/or associated directions, distance, landmarks, or other references with respect to an identified location. In some embodiments, the advertising message can include an embedded link for directions, maps, location details, including story details, etc. In some embodiments, the dynamic field may be populated by directional information, including the name of the street, neighborhood, direction or speed of device.

A base station 22 is shown in FIG. 2 for transmitting a broadcast message to selected ones of a plurality of mobile devices 12A-12G. As shown in FIG. 2, the mobile devices 12A-12G are each located at a position with respect to two commercial enterprises 50A and 50B, and a geographic region 60 is selected in an area adjacent the commercial enterprise 50A. The base station 22 transmits an advertising message to the mobile devices 12A, 12B, and 12C, which are located in the select a geographic region 60. The advertising message can include information about the commercial enterprise 50A, including information about services or products available at the commercial enterprise 50A, coupons, promotional items, and the like.

Figure 4:
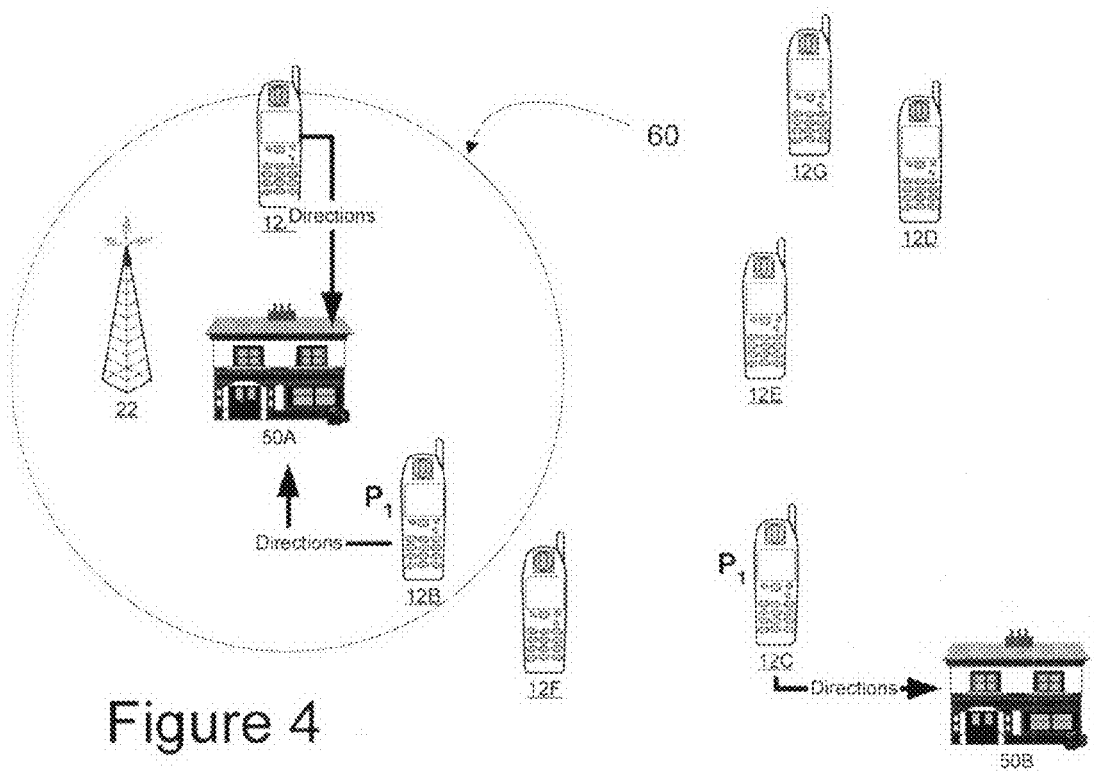
FIG. 4 is a schematic diagram illustrating directions from some of the mobile devices to a location in the network of FIG. 2.

Although the devices 12A, 12B, and 12C, may notify the user when the advertising message is received, such as with an audible or visual notification, a user may not open or activate the advertising message until a later time. For example, as shown in FIGS. 3 and 4, the mobile devices 12B and 12C receive the advertising message at initial positions $P_0$ when the devices 12B and 12C are within the geographic region 60. However, at a later time, the devices 12B and 12C are located at new respective positions $P_1$. For example, the mobile device service provider or a GPS or tracking service may track the location of the devices 12A, 12B and 12C. The devices 12A, 12B and 12C may be tracked continuously or at selected times or on a request basis, such as when the user opens an advertising message.

In some embodiments, the commercial enterprises 50A and 50B may be related businesses, such as franchises operated under the same trademark and/or offering the same or similar products or services. As shown in FIG. 4, if the commercial enterprises 50A and 50B are related, then one of the enterprises 50A-50B may be selected based on the current position $P_1$ of the devices 12B and 12C. As shown in FIG. 4, if the advertising message is activated by the mobile device 12B from the position $P_1$, the advertising message provides directions from the position $P_1$ to the commercial enterprise 50A because the commercial enterprise 50A is closer to the mobile device 12B than the commercial enterprise 50B. However, the current location $P_1$ of the device 12C is closer to the enterprise 50B than to the enterprise 50A, and therefore, directions are provided from the device 12B to the enterprise 50B.

As illustrated in FIGS. 1-4, directions can be provided to the mobile device 12A-12G in real time in response to the activation of a message that was received previously. In some embodiments, the advertising message can include a dynamic field configured to provide directions to an identified location. The dynamic field of the advertising message can be automatically populated based on the current position of the mobile device to provide directions from the current position of the mobile device to the identified location when the advertising message is activated. The dynamic field can include data for displaying the directions, such as the font or formatting of the directions, including integrated maps, landmarks, and the like.

In particular embodiments, the advertising message is an integrated graphical image that includes advertising information about the commercial enterprise and a dynamic field for providing real-time directions to the commercial enterprise based on the current position of the mobile device. For example, the dynamic field can include data for displaying the direction so that the directions are integrated in a graphical advertising image.

The current location of the devices 12A, 12B and 12C can be determined, for example, using GPS techniques and/or signal triangulation techniques. Examples of suitable techniques include assisted GPS, enhanced observed time difference (E-OTD), uplink time difference of arrival (U-TDPA), advanced forward link trilateration (AFLT), and cell ID positioning.

The directions may be customized for a particular device and/or environment. For example, the velocity of the device can be determined by determining the rate of change of the position of the device using the techniques discussed above, in different directions may be provided based on a velocity of the device. If the device is traveling greater than a threshold speed, such as 15 mph, then it is likely that the device is in a car, and the directions can be customized for an automobile (e.g., using freeways and roads used by automobiles). However, if the device is traveling less than the threshold speed, such as 15 mph, then it is likely that the device is being carried by a pedestrian, and the directions can be customized for a pedestrian (e.g., using walkways that may be unavailable to an automobile).

Figure 5:
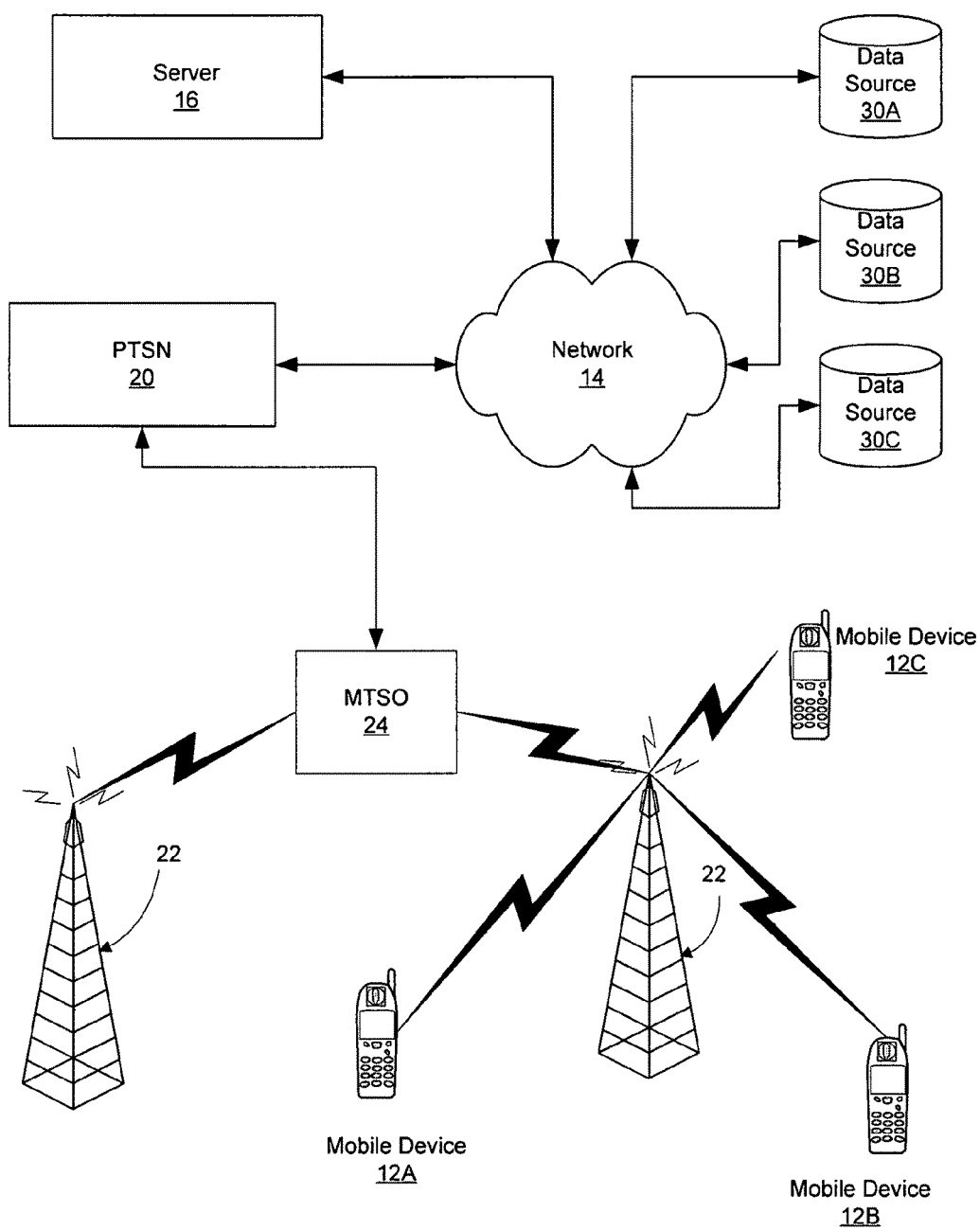
FIG. 5 is a is a schematic diagram illustrating a communication network according to some embodiments of the present invention.

FIG. 5 illustrates a network environment in which embodiments of the present invention may be utilized. As will be appreciated by those of skill in the art, however, the operations of embodiments of the present invention may be carried out on a processing system that communicates with one or more other devices with or without access to a network such as an intranet or the Internet. As seen in FIG. 5, mobile devices 12A, 12C, and 12C can communicate over a network 14. The mobile devices 12A, 12C, and 12C can be radiotelephones or other handheld devices, such as a personal wirelessly enabled digital assistants (personal data assistants (PDAs), such as Palm Pilot™ or a Pocket PC™), smartphones, pagers, wireless messaging devices (such as a Blackberry™ wireless handheld device), wireless enabled laptop computers, other mobile communications devices and/or combinations thereof. The mobile devices 12A, 12C, and 12C can communicate through one or more mobile telecommunications switching offices (MTSOs) 24 via base stations 22. The MTSO 24 may provide communications with a public telecommunications switching network (PTSN) 20, which can, in turn, can provide communications with the network 14. The mobile devices 12A, 12C, and 12C may be connected to the network 14 using various techniques, including those known to those of skill in the art, such as using a Wireless Fidelity (Wi-Fi) or Worldwide Interoperability for Microwave Access (Wi-Max) connection.

It should be understood that the various devices 12A, 12B, and 12C can communicate with the network 14 directly or indirectly, such as via other networks, including wireless networks. Moreover, devices can be provided that combine certain functionalities of the various devices 12A, 12B, and 12C. For example, a single device may be configured to connect to the network 14 through either the base station 22, the MTSO 24, the PTSN 20, a modem, a wireless network or a combination thereof.

The devices 12A, 12B, and 12C may utilize applications to communicate over the base station (s) 22, the MTSO 24, and/or network 14 to another mobile device, stationary device, or data processing system, such as a server 16. The network 14 may be an intranet or the Internet or other networks known to those of skill in the art. The devices 12A, 12B, and 12C can include applications that can display the data in a display window, which can be provided on the devices 12A, 12B, and 12C and viewed and manipulated by the user.

As is further illustrated in FIG. 5, the server 16 can be in communication with data sources 30A, 30B, and/or 30C and/or the PTSN 20. The data sources 30A, 30B, and 30C can be computer servers, processing systems, and/or other network elements that can send data to the clients 12A, 12B and 12C over the network 14.

Figure 6:
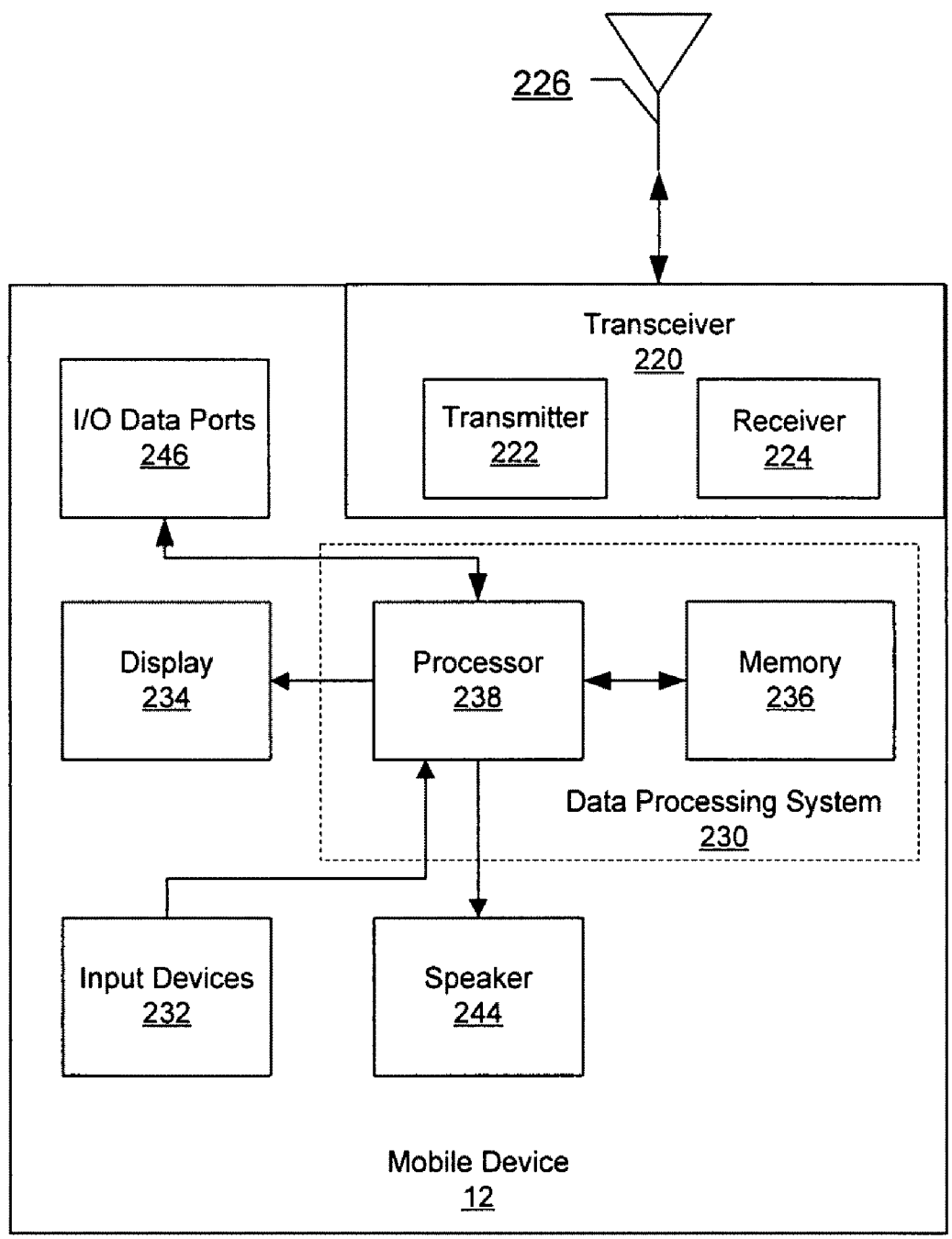
FIG. 6 is a block diagram illustrating a mobile device according to some embodiments of the present invention.

Referring to FIG. 6, exemplary embodiments of a mobile device 12 having a data processing system 230 in accordance with embodiments of the present invention are shown. The mobile device 12 may include input device(s) 232 (such as a keyboard or keypad, touch sensitive screen, light sensitive screen, and/or mouse), a display 234, and a memory 236 that communicate with a processor 238. The mobile device 12 may further include a speaker 244, and an I/O data port(s) 246 that also communicates with the processor 238. The I/O data port(s) 246 can be used to transfer information between the data processing system 230 and another computer system or a network (e.g., the Internet). These components may be conventional components such as those used in many conventional data processing systems, which may be configured to operate as described herein. The mobile device 12 may include a wireless transceiver 220 coupled to an antenna 226 and the processing system 230. The transceiver 220 includes a wireless transceiver including a transmitter 222 and a receiver 224 configured to establish a wireless connection, such as a cellular telephone connection, with at least one other mobile electronic device and/or base station within the range of the transceiver 220. In some embodiments, the antenna 226 may be a directional antenna array configured to be used to determine a traveling vector (including speed, distance, direction of movement, and/or relative positional data) for the mobile electronic device 12 based on a signal received from the antenna 226 by a base station. While only a single antenna 365 is illustrated in FIG. 6 by way of example, multiple antennas may be provided.

Figure 7:
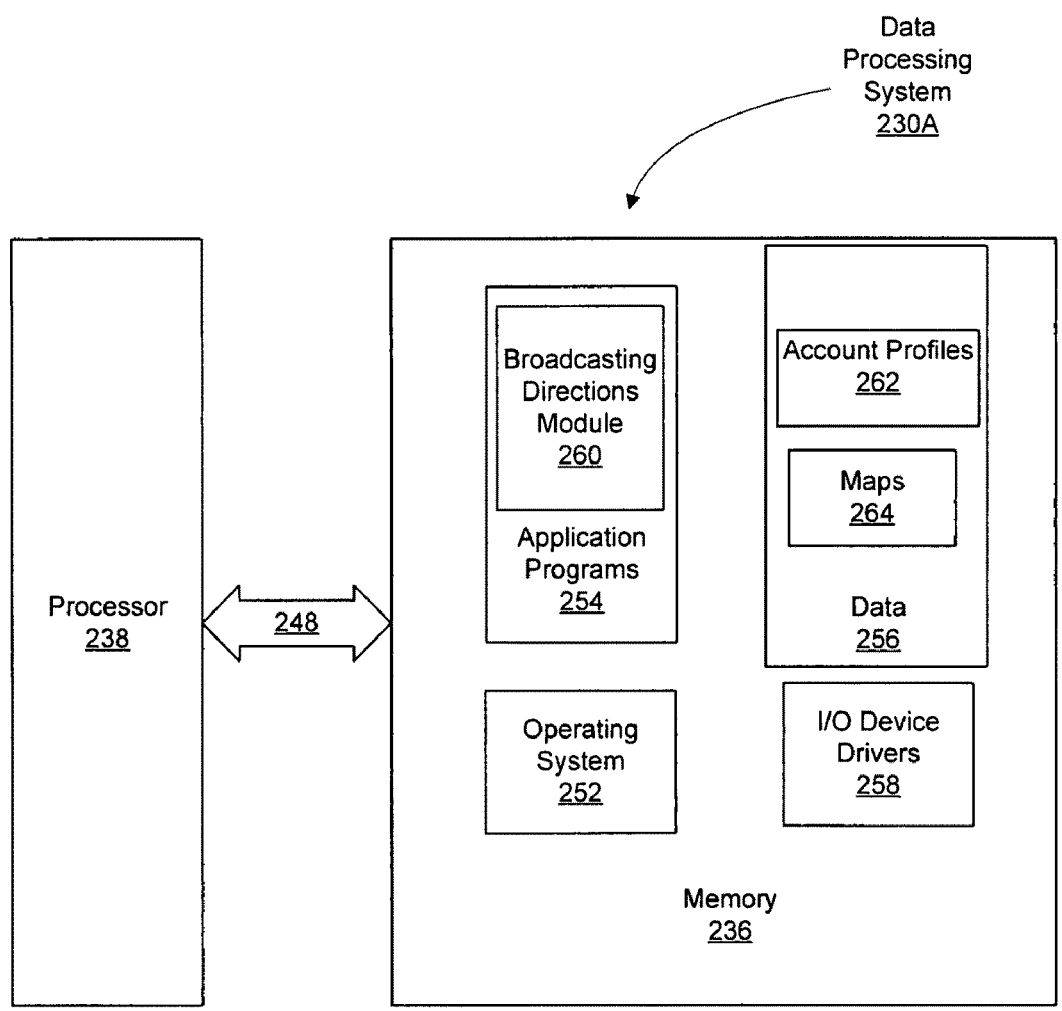
FIG. 7 is a block diagram illustrating a data processing system according to some embodiments of the present invention.

FIG. 7 is a block diagram of embodiments of data processing systems that illustrates systems, methods, and computer program products in accordance with embodiments of the present invention. For example, the systems illustrated in FIG. 7 may be incorporated as part of the server 16 and/or the mobile devices 12A, 12B and/or 12C of FIG. 5. As shown in FIG. 7, a processor 238 communicates with memory 236 via an address/data bus 248. The processor 238 can be any commercially available or custom microprocessor. The memory 236 is representative of the overall hierarchy of memory devices containing the software and data used to implement the functionality of the data processing system 230A. The memory 236 can include, but is not limited to, the following types of devices: cache, ROM, PROM, EPROM, EEPROM, flash memory, SRAM, and DRAM.

As shown in FIG. 7, the memory 236 may include several categories of software and data used in the data processing system 230A: an operating system 252; application programs 254; input/output (I/O) device drivers 258; and data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000, Windows NT, WindowsXP, or Windows Mobile from Microsoft Corporation, Redmond, Wash., Palm 05, Unix or Linux. The I/O device drivers 258 may include software routines accessed through the operating system 252 by the application program 254 to communicate with devices such as the input devices 232, the display 234, the speaker 244, the I/O data port(s) 246, and certain components of the memory 236. The application programs 254 are illustrative of the programs that implement the various features of the data processing system 230A and can include at least one application that provides operations of embodiments of the present invention. The data 256 represents the static and dynamic data used by the application programs 254, the operating system 252, the I/O device drivers 258, and other software programs that may reside in the memory 236.

In some embodiments, the data processing systems illustrated with respect to FIG. 7 may be included as part of the server 16 and/or the mobile devices 12A, 12B and 12C in FIG. 5. As is further seen in FIG. 7, the application programs 254 can include a broadcasting/directions module 260.

The data 256 can include account profiles 262 and directions/maps 264. For example, the data 256 can be used by the broadcasting directions module 260 to select a geographic region, to select mobile devices in the geographic region (for example, based on a user profile), and/or to provide directions/maps 264 that can be customized to provide directions to a specific location.

The broadcasting/directions module 260 may carry out operations as described herein for broadcasting an advertising message to at least one mobile device in a selected geographic region and/or for providing directions to a mobile device.

For example, the broadcasting/directions module 260 and data 256 may be included as part of the server 16 of FIG. 5 and may select a geographic region and provide instructions to a base station 22 to transmit a particular advertising message to mobile devices 12A, 12B and 12C within the selected geographic region. Account profiles 262 may be used to select a subset of the mobile devices 12A, 12B and/or 12C to receive the advertising message, for example, based on individual user profiles. The maps 264 may be used by the broadcasting/directions module 260 to provide real-time directions when the advertising message is activated.

As another example, the broadcasting/directions module 260 and data 256 may be included as part of one or more of the mobile devices 12A, 12B and/or 12C. The broadcasting/directions module 260 may receive a broadcast advertising message, activate the message at a later date, and/or determine directions based on the maps 264.

Real-time directions may be transmitted to a mobile device 12A, 12B and/or 12C or the devices 12A, 12B and/or 12C may include maps 264 or other geographic data for providing the directions to the user without requiring an outside transmission of data. In some embodiments, functions of the broadcasting/directions module 260 may be included as part of the mobile devices 12A, 12B and/or 12C and the server 16 of FIG. 5. For example, a broadcasting module at the server 16 can control the broadcasting of an advertising message to the mobile devices 12A, 12B and 12C and a directions module on the mobile devices 12A, 12B and 12C can control providing real-time directions.

Although the present invention is illustrated, for example, with reference to broadcasting directions module 260, account profiles 262, and directions/maps 264, as will be appreciated by those of skill in the art, the broadcasting directions module 260, account profiles 262, and directions/maps 264 may also be incorporated into other components, such as the operating system 252. Thus, the present invention should not be construed as limited to the configurations illustrated but is intended to encompass any configuration capable of carrying out the operations described herein.

Figure 8:
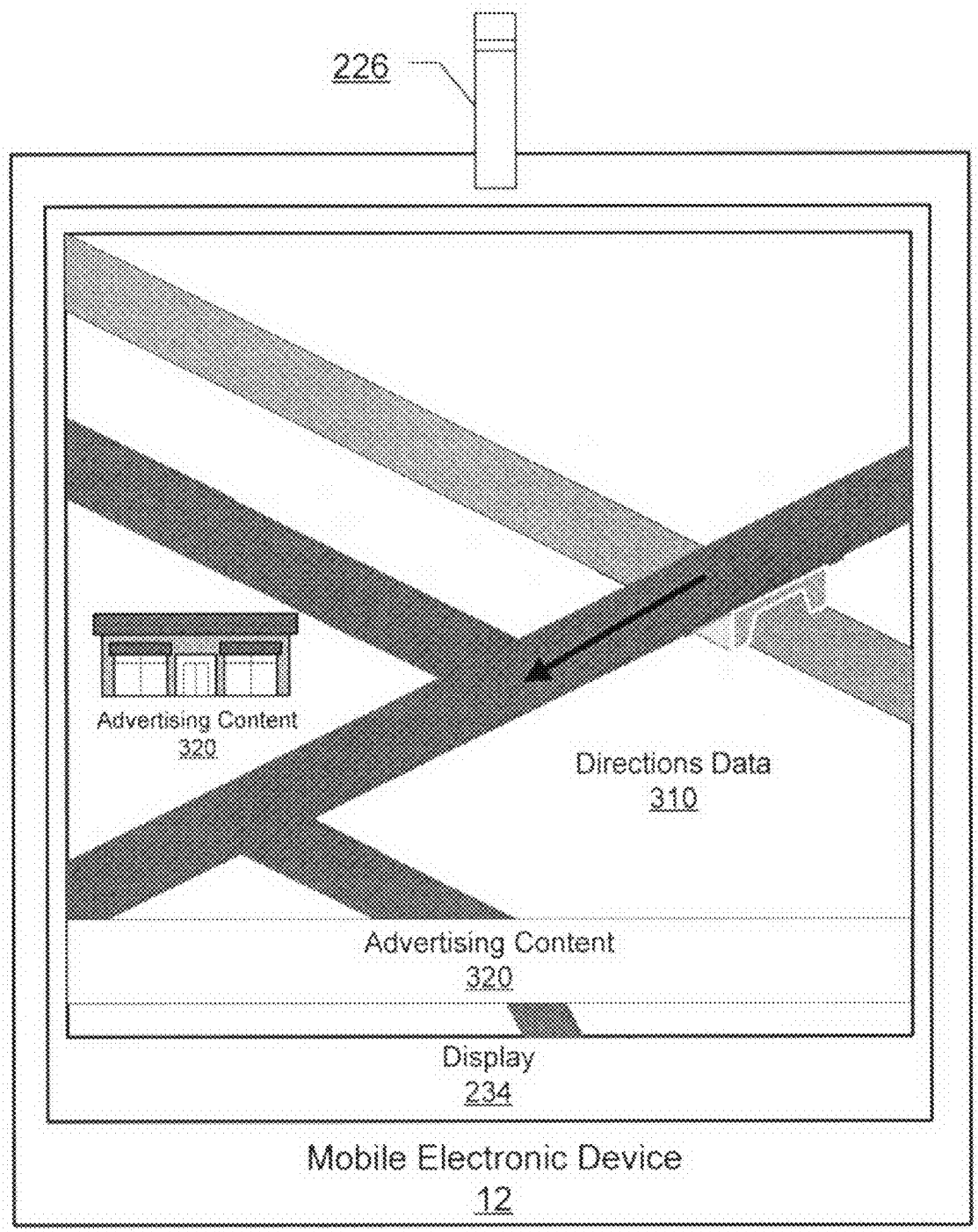
FIG. 8 is a schematic diagram illustrating a mobile device and a display according to some embodiments of the present invention.

The device 12 and an exemplary display 234 are shown in FIG. 8. The display 234 includes a graphical image 300. The image 300 includes integrated directions data 310 and advertising content 320. For example, as illustrated, the advertising content 320 is displayed overlapping the directions data 310; however, non-overlapping formats may also be used. Although the directions data 310 shown in FIG. 8 includes a map, it should be understood that other formats, including text, may be used. The advertising content 320 and the directions data 310 may be displayed so that the advertising content 320 is prominent or larger than the directions data 310 or the directions data 310 may be prominent or larger than the advertising content 320.

Although some embodiments according to the invention are described herein with respect to commercial enterprises, it should be understood that any location, including landmarks, public places, non-profit organizations, etc., may be used.

It should be understood that various techniques that can be used for providing directions to identified locations are within the scope of the invention. For example, an advertising message can be sent to a mobile device in a selected region by a base station or other suitable transmission technique. When the user activates a message, the current location of the mobile device can be determined using a variety of techniques, including GPS or triangulation at the mobile device and/or at the base station. In some embodiments, the location can be transmitted to a server (such as server 16 in FIG. 5) and/or directions can be generated at the server. The server can transmit directions to the mobile device and/or the base station(s) can transmit directions to the mobile device. In some embodiments, the mobile device can generate directions, for example, using geographic data that is stored by the mobile device and/or the server.

Although embodiments of the current invention are described herein with respect to providing directions to a mobile device, it should be understood that the dynamic field of the advertising message can be populated to provide various types of updated information. For example, the dynamic field can be populated with information about the status of the identified location or enterprise in the advertising message, including, e.g., contact information (such as an address or a phone number) for the nearest business in the chain or franchise of business and/or the status of the business (such as open, closed, an advertised price, the length of customer queue, capacity (whether the business is full or empty), promotions for sales, sale time remaining, quantity of products remaining and the like).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method, for providing up-to-date information to a user of a mobile device, by way of an integrated graphical presentation displayed by the mobile device, the integrated graphical presentation including (i) an advertising field and (ii) a dynamic field, the method comprising:
   notifying the user, by way of the mobile device, that an advertising message has been received, the advertising message relating to a destination;
   receiving input from the user of the mobile device for activating the advertising message;
   activating the advertising message in response to the input, received from the user, for activating the message;
   in response to activating the message, determining a current position of the mobile device and a current speed of the mobile device;
   in response to (A) activating the message, (B) determining the current position of the mobile device, and (C) determining a current speed of the mobile device, determining, based on the speed of the mobile device, whether to present to the user, by way of the dynamic field of the integrated graphical display, a selected format for directions including:
      (I) directions providing an automobile route from the current position of the mobile device to the destination; or
      (II) directions providing a non-automobile route from the current position of the mobile device to the destination; and
   initiating display of the integrated graphical presentation, by way of the display of the mobile device, including (i) the advertising field, identifying the destination, and (ii) the dynamic field, presenting directions in the selected format.

2. The method of claim 1, wherein determining whether to present to the user, by way of the dynamic field, the selected format for directions, being (I) directions providing the automobile route or (II) directions providing the non-automobile route, includes determining whether the current speed of the mobile device is greater than a threshold speed or less than the threshold speed, the threshold speed corresponding to a likelihood of whether the mobile device is likely moving in an automobile.

3. The method of claim 1, wherein initiating display of the integrated graphical presentation includes initiating display of (ii) the dynamic field to present directions in the selected format and to present status information for the destination.

4. The method of claim 3, wherein the status information includes a length of a customer queue for the destination.

5. The method of claim 3, wherein the status information includes a capacity of the destination.

6. The method of claim 3, wherein the status information includes a quantity of remaining products.

7. The method of claim 3, wherein the status information includes an indication that the destination is one of multiple locations for a franchised enterprise.

8. The method of claim 3, wherein the status information includes an open status or a closed status for the destination.

9. The method of claim 3, wherein the status information indicates whether the business is full or empty.

10. The method of claim 1, wherein:
   the message, in relating to the destination, relates to a franchised enterprise having multiple franchised locations;
   the method further comprises identifying, based on the current position of the mobile device, a closest one of the multiple franchised locations; and
   directions of the selected format include directions, for (I) the automobile route or the (II) non-automobile route, from the current position of the mobile device to the closest one of the multiple franchised locations.

11. A tangible computer-readable storage medium, for providing up-to-date information to a user of a mobile device by way of an integrated graphical presentation displayed by the mobile device, the integrated graphical presentation including (i) an advertising field and (ii) a dynamic field, comprising instructions that, when executed by a processor, cause the processor to perform a method comprising:
   notifying the user, by way of the mobile device, that an advertising message has been received, the advertising message relating to a destination;
   receiving input from the user of the mobile device for activating the advertising message;
   activating the advertising message in response to the input, received from the user, for activating the message;
   in response to activating the message, determining a current position of the mobile device and a current speed of the mobile device;
   in response to (A) activating the message, (B) determining the current position of the mobile device, and (C) determining a current speed of the mobile device, determining, based on the speed of the mobile device, whether to present to the user, by way of the dynamic field of the integrated graphical display, a selected format for directions including:
- (I) directions providing an automobile route from the current position of the mobile device to the destination; or
- (II) directions providing a non-automobile route from the current position of the mobile device to the destination; and initiating display of the integrated graphical presentation, by way of the display of the mobile device, including (i) the advertising field, identifying the destination, and (ii) the dynamic field, to present directions in the selected format.

12. The tangible computer-readable storage medium of claim 11, wherein the storage medium is a component of the mobile device.

13. The tangible computer-readable storage medium of claim 11, wherein the storage medium is a component of a network with which the mobile device communicates for obtaining the message and information for the integrated graphical presentation.

14. The tangible computer-readable storage medium of claim 11, wherein:
initiating display of the integrated graphical presentation includes initiating display of (ii) the dynamic field, to present directions in the selected format and status information for the destination; and
the status information includes a length of a customer queue for the destination.

15. The tangible computer-readable storage medium of claim 11, wherein:
initiating display of the integrated graphical presentation includes initiating display of (ii) the dynamic field, to present directions in the selected format and status information for the destination; and
the status information includes a capacity of the destination.

16. The tangible computer-readable storage medium of claim 11, wherein:
initiating display of the integrated graphical presentation includes initiating display of (ii) the dynamic field, to present directions in the selected format and status information for the destination; and
the status information includes a quantity of remaining products.

17. The tangible computer-readable storage medium of claim 11, wherein:
initiating display of the integrated graphical presentation includes initiating display of (ii) the dynamic field, to present directions in the selected format and status information for the destination; and
the status information includes an indication that the destination is one of multiple locations for a franchised enterprises.

18. The tangible computer-readable storage medium of claim 11, wherein:
initiating display of the integrated graphical presentation includes initiating display of (ii) the dynamic field, to present directions in the selected format and status information for the destination; and
the status information includes an open or closed status for the destination.

19. The tangible computer-readable storage medium of claim 11, wherein:
the message, in relating to the destination, relates to a franchised enterprise having multiple franchised locations;
the method further comprises identifying, based on the current position of the mobile device, a closest one of the multiple franchised locations; and
directions of the selected format of directions include directions, of (I) the automobile route or the (II) non-automobile route, from the current position of the mobile device to the closest one of the multiple franchised locations.

20. A system, for providing up-to-date information to a user of a mobile device by way of an integrated graphical presentation displayed by the mobile device, the integrated graphical presentation including (i) an advertising field and (ii) a dynamic field, comprising:
a processor; and
a computer-readable storage having instructions that, when executed by the processor, cause the processor to perform a method comprising:
notifying the user, by way of the mobile device, that an advertising message has been received, the advertising message relating to a destination;
receiving input from the user of the mobile device for activating the advertising message;
activating the advertising message in response to the input, received from the user, for activating the message;
in response to activating the message, determining a current position of the mobile device and a current speed of the mobile device;
in response to (A) activating the message, (B) determining the current position of the mobile device, and (C) determining a current speed of the mobile device, determining, based on the speed of the mobile device, whether to present to the user, by way of the dynamic field of the integrated graphical display, a selected format for directions including:
- (I) directions providing an automobile route from the current position of the mobile device to the destination; or
- (II) directions providing a non-automobile route from the current position of the mobile device to the destination; and initiating display of the integrated graphical presentation, by way of the display of the mobile device, including (I) the advertising field, identifying the destination, and (ii) the dynamic field, presenting directions in the selected format.

* * * * *